United States Patent
Lin et al.

(10) Patent No.: US 8,589,569 B2
(45) Date of Patent: Nov. 19, 2013

(54) METHOD AND APPARATUS FOR INVOKING A PLUG-IN ON A SERVER

(75) Inventors: Cheng-Fang Lin, Palo Alto, CA (US); Samit Roy, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 1650 days.

(21) Appl. No.: 11/517,200

(22) Filed: Sep. 6, 2006

(65) Prior Publication Data
US 2008/0059479 A1 Mar. 6, 2008

(51) Int. Cl.
G06F 17/30 (2006.01)
(52) U.S. Cl.
USPC .......................................... 709/228; 707/705
(58) Field of Classification Search
USPC ........................................................ 709/228
See application file for complete search history.

(56) References Cited

U.S. PATENT DOCUMENTS

| | | | |
|---|---|---|---|
| 6,366,916 B1 * | 4/2002 | Baer et al. ............................. | 1/1 |
| 7,334,039 B1 * | 2/2008 | Majkut et al. ................. | 709/229 |
| 2003/0119386 A1 * | 6/2003 | Laux et al. .................... | 439/894 |
| 2004/0177352 A1 * | 9/2004 | Narayanaswamy et al. .. | 717/169 |

OTHER PUBLICATIONS

Decasper et al. Router Plugins: A software Architecture for Next-Generation Routers, Feb. 2000.*

* cited by examiner

Primary Examiner — Thomas Tarcza
Assistant Examiner — Maceeh Anwari
(74) Attorney, Agent, or Firm — Shun Yao; Park, Vaughan, Fleming & Dowler LLP

(57) ABSTRACT

One embodiment of the present invention provides a system stored on a non-transitory computer-readable storage medium for invoking a plug-in that is dynamically associated with a database operation. During operation, a client sends a request to a database system to perform an operation on the database, wherein the request includes a control-message which specifies a plug-in which needs to be executed. Next, the system executes the plug-in at a plug-in server to obtain a plug-in result. Then, the system determines if the plug-in result is an error identifier. If so, the system sends the error identifier to the client. On the other hand, if the plug-in result is not an error identifier, the system performs the operation to obtain an operation result. The system then sends the operation result to the client.

20 Claims, 3 Drawing Sheets

METHOD AND APPARATUS FOR INVOKING A PLUG-IN ON A SERVER

BACKGROUND

1. Field of the Invention

The present invention relates to client-server applications. More specifically, the present invention relates to a method and apparatus for invoking a plug-in that is dynamically associated with a database operation.

2. Related Art

Large organizations often employ specialized databases, such as directory servers, to serve as an abstraction layer between clients and shared resources. Directory servers typically store user-specific information (e.g., user permissions) and policy information. Furthermore, a directory server usually supports a number of operations (e.g., add, bind, compare, etc.) on the stored information which can be invoked by sending a request to the directory server.

A common technique for extending operations at a directory server involves statically binding a plug-in to an operation. When a directory server receives a request to perform the operation, the directory server performs the operation by invoking the associated plug-in.

In a large organization, different groups may require the directory server to perform an operation in a slightly different manner based on the groups' specific requirements. For example, one group may want all search results to be paged and sorted, whereas another group may want raw search results.

Unfortunately, prior art directory servers do not enable a client to control the functionality of an operation. Hence, in prior art techniques, different groups within an organization may have to settle for a compromised set of functionalities that do not satisfy the requirements of any of the groups. Moreover, each group may have to implement the additional functionality (e.g., paging and sorting) at the client side which can cause code duplication. Additionally, maintaining multiple directory servers which support different sets of operations can be expensive, time-consuming, and less secure.

Hence, what is needed is a method for extending the functionality of a specialized database without the problems listed above.

SUMMARY

One embodiment of the present invention provides a system for invoking a plug-in that is dynamically associated with a database operation. During operation, a client sends a request to a database system to perform an operation on the database, wherein the request includes a control-message which specifies a plug-in which needs to be executed. Next, the system executes the plug-in at a plug-in server to obtain a plug-in result. Then, the system determines if the plug-in result is an error identifier. If so, the system sends the error identifier to the client. On the other hand, if the plug-in result is not an error identifier, the system performs the operation to obtain an operation result. The system then sends the operation result to the client.

In a variation on this embodiment, the request to perform the operation includes context-information associated with the operation. The context-information can specify the execution environment within which the operation is executed.

In a further variation, executing the plug-in involves sending the context-information to the plug-in server to facilitate executing the plug-in.

In a further variation, the context-information can include: an operation-identifier, a set of operation-arguments, and a user-identifier.

In a variation on this embodiment, the request to perform the operation can include a time-specification which specifies when to execute the plug-in.

In a variation on this embodiment, the control-message includes a plug-in list which specifies a list of plug-ins to execute.

In a variation on this embodiment, executing the plug-in involves determining if a set of invocation-criteria associated with the plug-in has been satisfied. If so, the system executes the plug-in. If not, the system sends an error message to the client.

In a further variation, the set of invocation-criteria can include: an existence-value which specifies whether the plug-in exists; a data-context which specifies what data the plug-in can access; a valid-group identifier which specifies which users can request that the plug-in be executed; an invalid-group identifier which specifies which users cannot request that the plug-in be executed; and a user-specified invocation-criteria which enable the user to specify criteria which have to be satisfied before the plug-in can be executed.

In a variation on this embodiment, the database can be a directory server.

DETAILED DESCRIPTION

Figure 1:
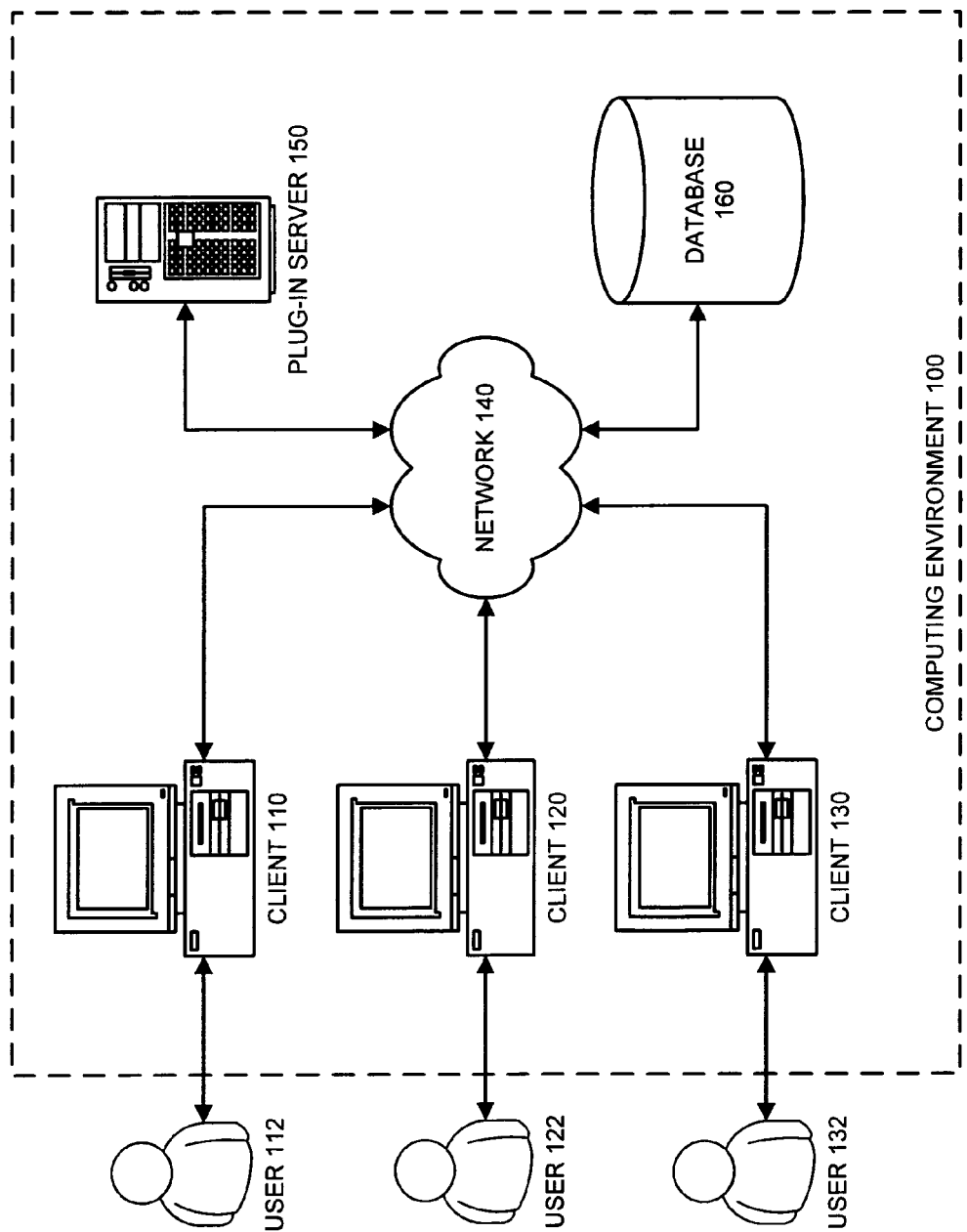
FIG. 1 illustrates a computing environment in accordance with an embodiment of the present invention.

The following description is presented to enable any person skilled in the art to make and use the invention, and is provided in the context of a particular application and its requirements. Various modifications to the disclosed; embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention enables a user to dynamically select a plug-in or set of plug-ins to execute before, after, or concurrently with an operation. Note that the operation can be a database operation, a directory server operation, or any other type of operation that can be associated with a plug-in known to those familiar with the art. In this embodiment, the user can dynamically select a set of plug-ins using a control-message, such as a Lightweight Directory Access Protocol (LDAP) control. The LDAP control enables the user to request that the database or the directory server execute a plug-in along with the database operation. Note that the plug-in does not have to be statically bound to a database-operation. Therefore, each time the user requests that the database execute a database operation, the user can request that the database execute a different plug-in along with the database-operation, or no plug-in. This is in contrast to prior art which usually associates plug-ins with operations when initializing the database. Consequently, in prior art techniques, the client has no control over which plug-in is executed when the operation is performed. In other words, in prior art techniques, exactly the same plug-in is executed regardless of who requests the operation.

In one embodiment of the present invention, the user can send additional information, such as context-information and invocation-criteria, to the database to facilitate in executing the plug-in.

In one embodiment of the present invention, the user can communicate with the database via any communication protocol capable of sending a plug-in execution request to a database.

In one embodiment of the present invention, the plug-in is not statically bound to an LDAP operation, or any other kind of operation. In this embodiment, a user or a client can dynamically invoke the execution of the plug-in whenever the user wants to execute the plug-in or a client application instructs the client to invoke the plug-in.

Computing Environment

FIG. 1 illustrates a computing environment 100 in accordance with an embodiment of the present invention. Computing environment 100 includes a number of computer systems. These computer systems can generally include any type of computer system based on a microprocessor, a mainframe computer, a digital signal processor, a portable computing device, a personal organizer, a device controller, or a computational engine within an appliance. More specifically, computing environment 100 includes client 110, client 120, client 130, network 140, plug-in server 150, and database 160.

Clients 110, 120, and 130 can generally include any node on a network including computational capability and including a mechanism for communicating across the network.

Network 140 can generally include any type of wired or wireless communication channel capable of coupling together computing nodes. This includes, but is not limited to, a local area network, a wide area network, or a combination of networks. In one embodiment of the present invention, network 140 comprises the Internet.

Plug-in server 150 can generally include any type of system that is capable of executing a plug-in.

Database 160 can generally include any type of system for storing data in non-volatile storage. This includes, but is not limited to, systems based upon magnetic, optical, and magneto-optical storage devices, as well as storage devices based on flash memory and/or battery-backed up memory. In one embodiment of the present invention, database 160 includes plug-in server 150.

In one embodiment of the present invention, database 160 is a directory server.

In one embodiment of the present invention, database 160 can request that plug-in server 150 execute different plug-ins each time user 112 sends a request to perform a given operation. For example, user 112 sends a first request to database 160 to perform a first search operation. The first request includes a control-message which causes database 160 to instruct plug-in server 150 to execute a "sort" plug-in. Note that the "sort" plug-in performs an alphabetic sort of the results from a search operation. Also, note that a control-message is any message, such as an LDAP control, that is capable of requesting database 160 to instruct that plug-in server 150 execute a plug-in. In one embodiment, database 160 can instruct plug-in server 150 to execute a plug-in by sending a request message to plug-in server 150. Next, user 112 sends a second request to database 160 to perform a second search operation. The second request includes a control-message that causes database 160 to instruct plug-in server 150 to execute a "sort" plug-in, and a "sanitize" plug-in. Note that the "sanitize" plug-in removes sensitive information from the results of a search operation. User 112 then sends a third request to database 160 to perform a third search operation. The third request does not include a control-message, thus database 160 does not instruct plug-in server 150 to execute a plug-in.

In one embodiment of the present invention, database 160 can instruct plug-in server 150 to execute a default plug-in. Note that database 160 may instruct plug-in server 150 to execute the default plug-in in response to: not receiving a control-message from user 112; or the type of connection between database 150 and client 110. In this embodiment, database 160 can instruct plug-in server 150 to execute a default plug-in in addition to the plug-ins requested by user 112.

In one embodiment of the present invention, database 160 can request that plug-in server 150 execute different plug-ins for different users. For example, user 122 sends a first request to database 160 to perform a modify operation on a first password stored on database 160. The first request includes context-information that specifies the first password and a new first password, and a control-message that causes database 160 to request plug-in server 150 to execute a "pwd check1" plug-in. Note that the "pwd check1" plug-in determines if the new first password includes only alphanumeric characters, and is at least six characters long. In this embodiment, user 132 sends a second request to database 160 to perform a modify operation on a second password stored on database 160. The second request includes context-information that specifies the second password and a new second password, and a control-message that requests that plug-in server 150 execute a "pwd check2" plug-in. Note that the "pwd check2" plug-in determines if the new second password includes only numbers and is at least four characters long.

In one embodiment of the present invention, plug-in server 150 can restrict who can execute a plug-in. For example, suppose that user 122 and user 132 work for a first organization and a second organization, respectively, and only users of the first organization are allowed to execute plug-in "pwd check1." In this example, plug-in server 150 will not execute the "pwd check1" plug-in in response to a request received from database 160 on behalf of user 132.

In one embodiment of the present invention, database 160 receives a control-message along with a request to perform an operation from user 112. This control-message can include a set of plug-in identifiers which are associated with a set of plug-ins stored on plug-in server 150. Database 160 then matches the set of plug-in identifiers to the set of plug-ins. If a set of invocation-criteria is satisfied, database 160 executes the set of plug-ins on plug-in server 150. Note that each time user 112 sends a request to perform the operation, user 112 can send a different control-message that includes a different set of plug-in identifiers. This is advantageous because user 112 can control which plug-ins are executed when database 160 performs an operation by sending different plug-in identifiers to database 160. In contrast, prior art techniques statically associate a set of plug-ins with an operation. For example, prior art techniques may associate an operation with a set of plug-ins while initializing a database. In prior art techniques, the database executes an operation and all plug-ins associated with the operation. Thus, the user cannot control which plug-ins are executed each time the user requests that an operation to be performed.

Performing an Operation

Figure 2:
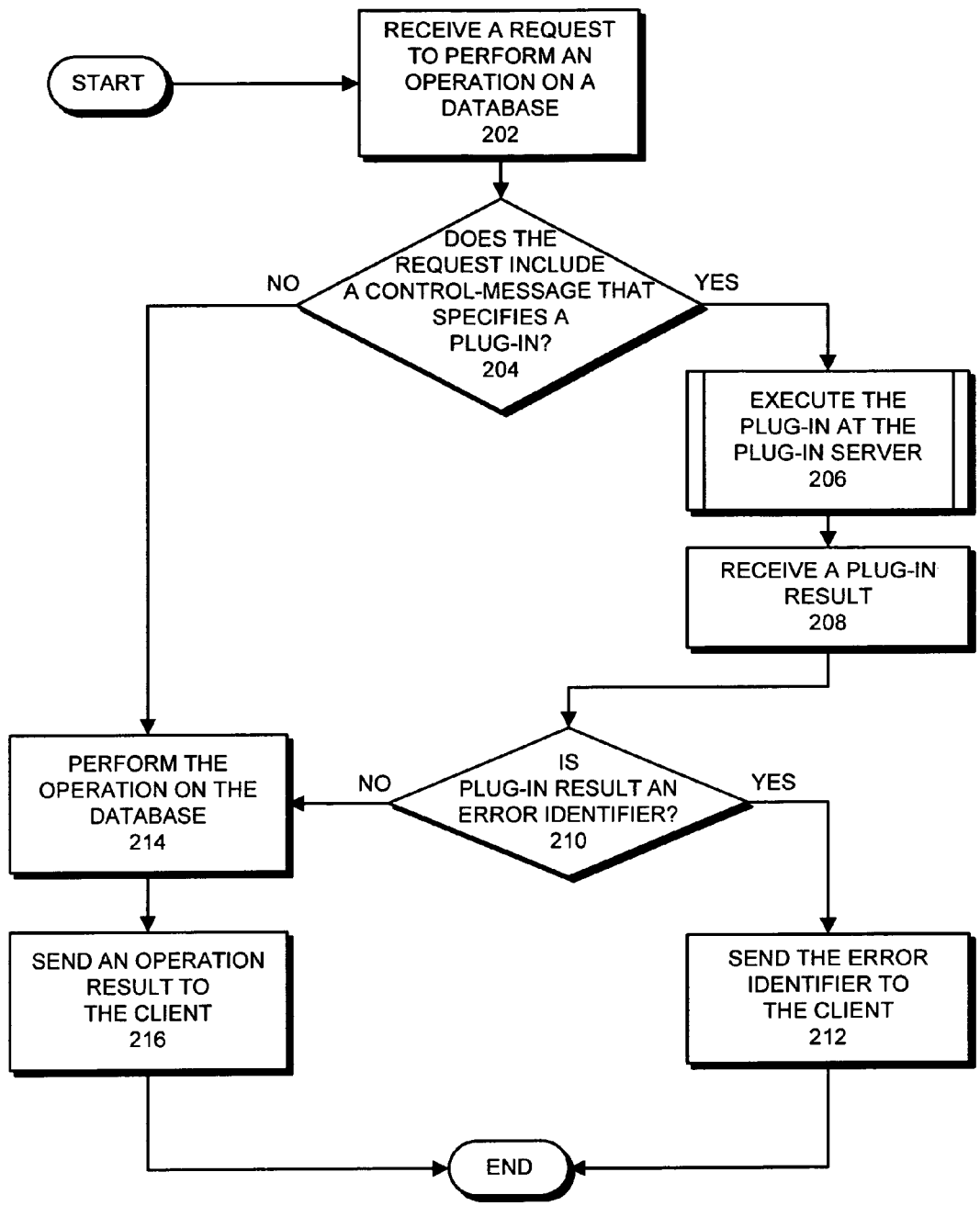
FIG. 2 presents a flowchart illustrating the process of performing an operation in accordance with an embodiment of the present invention.

FIG. 2 presents a flowchart illustrating the process of performing an operation in accordance with an embodiment of the present invention.

The process begins when database 160 receives a request from client 110 to perform an operation on database 160 (step 202). Note that the request to perform the operation can include a control-message, such as an LDAP control, which specifies a plug-in for database 160 to execute on plug-in system 150. Furthermore, note that the plug-in is dynamically bound to the operation. Therefore, each time user 112 requests that database 160 perform the operation, user 112 can request that database 160 execute a different plug-in on plug-in server 150, or no plug-in.

In one embodiment of the present invention, the request to perform the operation can include context-information associated with the operation. This context-information can include: an operation-identifier, a set of operation-arguments, a user-identifier, and any other context-information that facilitates database 160 to execute the operation and/or a plug-in.

In one embodiment of the present invention, the request to perform the operation can include a time-specification which specifies when to execute the plug-in. In this embodiment, database 160 can execute the plug-in before performing the operation, after performing the operation, or while performing the operation.

In one embodiment of the present invention, the control-message. can include a plug-in list which specifies a list of plug-ins to execute. In this embodiment, database 160 can execute the plug-ins in an alphabetized order, in a prioritized order, in a random order, or in an order as specified by the control-message.

Next, database 160 determines if the request to perform an operation includes a control-message that specifies a plug-in (step 204). If so, database 160 executes the plug-in at plug-in server 150 (step 206). Note that executing the plug-in can involve a multi-step process, which is described in more detail below with reference to FIG. 3.

Database 160 then receives a plug-in result from plug-in server 150 (step 208). Next, database 160 determines if the plug-in result is an error identifier (step 210). If so, database 160 sends the error identifier to client 110 (step 212). In one embodiment of the present invention, database 160 sends an error message associated with the error identifier to client 110 in addition to or in place of the error identifier.

If the request to perform an operation does not include a control-message that specifies a plug-in, or if the plug-in result is not an error-identifier, database 160 performs the operation (step 214). In one embodiment of the present invention, database 160 uses the plug-in result to facilitate performing the operation. For example, if the operation is a modify password request and the plug-in is a password-format check plug-in, database 160 can execute the plug-in to determine if database 160 should fulfill the modify password request.

In one embodiment of the present invention, database 160 performs the operation before executing the plug-in at plug-in server 150. In this embodiment, database 160 can use an operation result, which specifies the result of the operation, to facilitate executing the plug-in at plug-in server 150. For example, if the operation is a search request and the plug-in is a sort plug-in, database 160 can use the operation result as input to the plug-in.

In one embodiment of the present invention, database 160 executes the operation and the plug-in concurrently.

Database 160 then sends the operation result to client 110 (step 216).

Executing a Plug-In

Figure 3:
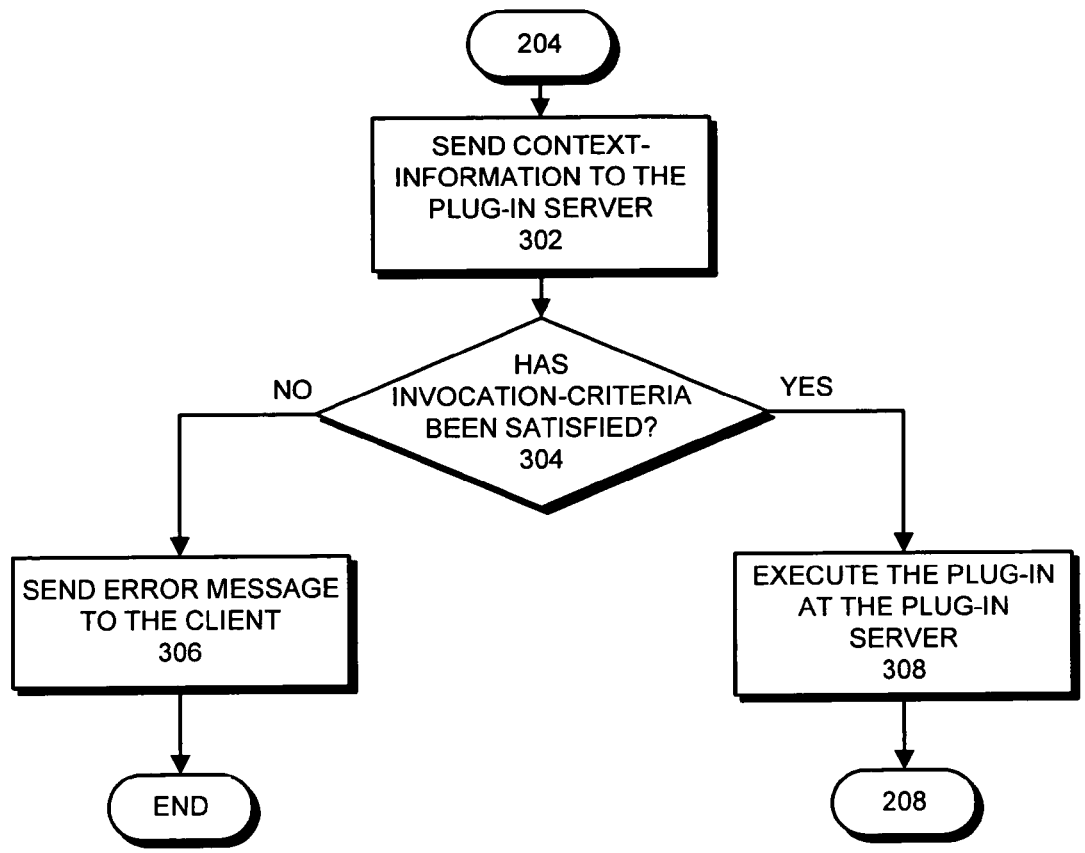
FIG. 3 presents a flowchart illustrating the process of executing a plug-in in accordance with an embodiment of the present invention.

FIG. 3 presents a flowchart illustrating the process of executing a plug-in in accordance with an embodiment of the present invention.

The process begins when database 160 sends context-information to plug-in server 150 (step 302).

In one embodiment of the present invention, database 160 receives additional invocation-criteria from client 110 (step 304). This step is optional as is illustrated by the dashed lines surrounding step 304.

Next, database 160 determines if a set of invocation-criteria has been satisfied (step 304). Note that the set of invocation-criteria can include: invocation-criteria associated with database 160 and/or plug-in server 150, invocation-criteria associated with a plug-in, and user-specified invocation-criteria received from client 110. Furthermore, note that the invocation-criteria can include: an existence-value, which specifies whether the plug-in exists; a data-context which specifies what data the plug-in can access; a valid-group identifier which specifies which users can request that database 160 execute the plug-in; an invalid-group identifier which specifies which users cannot request that database 160 execute the plug-in; or any other invocation-criteria for determining if database 160 can execute the plug-in known to those familiar with the art.

In one embodiment of the present invention, database 160 can base the data-context on the plug-in, user 112's permissions, the time of day, the client user 112 is accessing, or any other method for determining the data-context known to those familiar with the art. In this embodiment, the data-context can be specific to a plug-in, a particular invocation of a plug-in, or a specific user.

If the invocation-criteria has been satisfied, database 160 executes the plug-in at plug-in server 150 (step 308). Database 160 then proceeds to step 208.

If the invocation-criteria has not been satisfied, database 160 sends an error message to client 110 (step 306).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for invoking execution of a plug-in that is dynamically bound to a database operation, comprising:
receiving, at a database directory server, a first request from a client to perform a database operation, wherein the first request includes a first directory-access control message which is specific to the request and specifies a first plug-in chosen by a user;
binding the first plug-in to the database operation so that the first plug-in is executed before, after, or during execution of the database operation;

receiving a second request to perform the database operation, wherein the second request includes a second directory-access control message which specifies a second plug-in; and binding the second plug-in to the database operation so that the second plug-in is executed before, after, or during execution of the database operation.

2. The method of claim 1, wherein the first or the second request to perform the database operation includes context-information associated with the operation.

3. The method of claim 2, wherein executing a plug-in involves sending the context-information to a plug-in server to facilitate executing the plug-in.

4. The method of claim 2, wherein the context-information can include:
an operation-identifier;
a set of operation-arguments; and
a user-identifier.

5. The method of claim 1, wherein the first or the second request to perform the database operation can include a time-specification which specifies when to execute the plug-in.

6. The method of claim 1, wherein the first or the second directory-access control message includes a plug-in list which specifies a list of plug-ins to execute.

7. The method of claim 1, wherein executing a plug-in involves:
determining if a set of invocation-criteria associated with the plug-in has been satisfied;
if so, executing the plug-in; and
if not, sending an error message to the client.

8. The method of claim 7, wherein the set of invocation-criteria can include:
an existence-value which specifies whether the plug-in exists;
a data-context which specifies what data the plug-in can access;
a valid-group identifier which specifies which users can request that the plug-in be executed;
an invalid-group identifier which specifies which users cannot request that the plug-in be executed; and
a user-specified invocation-criteria.

9. A non-transitory computer-readable storage medium storing instructions that when executed by a computer cause the computer to perform a method for invoking the execution of a plug-in that is dynamically bound to a database operation, the method comprising:
receiving, at a database directory server, a first request from a client to perform a database operation, wherein the first request includes a first directory-access control message which is specific to the request and specifies a first plug-in chosen by a user;
binding the first plug-in to the database operation so that the first plug-in is executed before, after, or during execution of the database operation;
receiving a second request to perform the database operation, wherein the second request includes a second directory-access control message which specifies a second plug-in; and
binding the second plug-in to the database operation so that the second plug-in is executed before, after, or during execution of the database operation.

10. The non-transitory computer-readable storage medium of claim 9, wherein the first or the second request to perform the database operation includes context-information associated with the operation.

11. The non-transitory computer-readable storage medium of claim 10, wherein executing a plug-in involves sending the context-information to a plug-in server to facilitate executing the plug-in.

12. The non-transitory computer-readable storage medium of claim 10, wherein the context-information can include:
an operation-identifier;
a set of operation-arguments; and
a user-identifier.

13. The non-transitory computer-readable storage medium of claim 9, wherein the first or the second request to perform the operation can include a time-specification which specifies when to execute the first or the second plug-in.

14. The non-transitory computer-readable storage medium of claim 10, wherein the first or the second directory-access control message includes a plug-in list which specifies a list of plug-ins to execute.

15. The non-transitory computer-readable storage medium of claim 9, wherein executing a plug-in involves:
determining if a set of invocation-criteria associated with the plug-in has been satisfied;
if so, executing the plug-in; and
if not, sending an error message to the client.

16. The non-transitory computer-readable storage medium of claim 15, wherein the set of invocation-criteria can include:
an existence-value which specifies whether the plug-in exists;
a data-context which specifies what data the plug-in can access;
a valid-group identifier which specifies which users can request that the plug-in be executed;
an invalid-group identifier which specifies which users cannot request that the plug-in be executed; and
a user-specified invocation-criteria.

17. An apparatus that invokes the execution of a plug-in that is dynamically bound to a database operation, comprising:
a processor;
a receiving mechanism coupled to the processor to receive a first request from a client to perform a database operation, wherein the first request includes a first directory-access control message which is specific to the request and specifies a first plug-in chosen by a user; and
a binding mechanism configured to bind the first plug-in to the database operation so that the first plug-in is executed before, after, or during execution of the database operation;
wherein the receiving mechanism is further configured to receive a second request to perform the database operation, wherein the second request includes a second directory-access control message which specifies a second plug-in; and
wherein, in response to receiving the second request, the binding mechanism is further configured to bind the second plug-in to the database operation so that the second plug-in is executed before, after, or during execution of the database operation.

18. The apparatus of claim 17, further comprising a sending mechanism configured to send context-information to a plug-in server to facilitate executing a plug-in.

19. The apparatus of claim 17, further comprising a determination mechanism configured to determine if a set of invocation-criteria associated with a plug-in has been satisfied.

20. The apparatus of claim 17, wherein the apparatus is part of a directory server.

* * * * *

UNITED STATES PATENT AND TRADEMARK OFFICE
CERTIFICATE OF CORRECTION

PATENT NO. : 8,589,569 B2
APPLICATION NO. : 11/517200
DATED : November 19, 2013
INVENTOR(S) : Lin et al.

Page 1 of 1

It is certified that error appears in the above-identified patent and that said Letters Patent is hereby corrected as shown below:

In the Specification:

In column 2, line 43, delete "disclosed;" and insert -- disclosed --, therefor.

In column 5, line 37, delete "message." and insert -- message --, therefor.

In the Claims:

In column 8, line 15, in Claim 14, delete "claim 10" and insert -- claim 9 --, therefor.

Signed and Sealed this
Tenth Day of June, 2014

Michelle K. Lee
*Deputy Director of the United States Patent and Trademark Office*